US007366712B2

(12) United States Patent
He et al.

(10) Patent No.: US 7,366,712 B2
(45) Date of Patent: Apr. 29, 2008

(54) INFORMATION RETRIEVAL CENTER GATEWAY

(75) Inventors: Liang He, Shanghai (CN); XiaoGang Zhu, Shanghai (CN); Chung Yun Yeung, Kowloon (HK); Jing Yong Zhu, Shanghai (CN); KeFeng Yang, Shanghai (CN); ChuanQuan Xie, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 09/938,322

(22) Filed: Aug. 23, 2001

(65) Prior Publication Data

US 2002/0184197 A1    Dec. 5, 2002

Related U.S. Application Data

(60) Provisional application No. 60/294,705, filed on May 31, 2001.

(51) Int. Cl.
*G06F 17/30* (2006.01)

(52) U.S. Cl. .................... 707/3; 707/10; 704/270.1; 704/277

(58) Field of Classification Search ............. 707/1–10; 709/203, 224, 228, 238, 239; 455/414.4, 455/421; 379/88.17, 88.01, 88.02, 88.03, 379/99.04; 704/1–9
See application file for complete search history.

(56) References Cited

U.S. PATENT DOCUMENTS

| 5,884,262 | A | * | 3/1999 | Wise et al. ............... 704/270.1 |
| 5,895,471 | A | | 4/1999 | King et al. ................ 707/104.1 |
| 6,018,710 | A | | 1/2000 | Wynblatt et al. ............ 704/260 |
| 6,073,100 | A | | 6/2000 | Goodridge, Jr. ............ 704/258 |
| 6,101,473 | A | | 8/2000 | Scott et al. ................. 704/275 |
| 6,138,156 | A | | 10/2000 | Fletcher et al. ............. 709/224 |
| 6,172,974 | B1 | * | 1/2001 | Tseng et al. ................ 370/357 |
| 6,173,311 | B1 | * | 1/2001 | Hassett et al. .............. 709/202 |
| 6,188,985 | B1 | | 2/2001 | Thrift et al. ................ 704/275 |
| 6,195,632 | B1 | | 2/2001 | Pearson ..................... 704/206 |
| 6,226,606 | B1 | | 5/2001 | Acero et al. ................ 704/218 |
| 6,233,577 | B1 | * | 5/2001 | Ramasubramani et al. .... 707/9 |
| 6,247,048 | B1 | * | 6/2001 | Greer et al. ................ 709/219 |
| 6,269,336 | B1 | | 7/2001 | Ladd et al. ................. 704/270 |

(Continued)

FOREIGN PATENT DOCUMENTS

EP    1094406    4/2001

(Continued)

OTHER PUBLICATIONS

"Wireless Application Protocol White Paper", *Wireless Internet Today*, XP-001069119, (Jun. 2000), A-B, 3-18.

(Continued)

*Primary Examiner*—Debbie M Le
(74) *Attorney, Agent, or Firm*—Schwegman, Lundberg & Woessner, P.A.

(57) ABSTRACT

A method, apparatus, and gateway allows a variety of client devices to access information from current information providers, and the information is adapted to accommodate the differing formats of the client devices. Speech processing, text-to-speech (TTS), speech feature transmission on heterogeneous networks, quality of service (QoS) support for real-time applications, transcoding, transformation, publish rendering, multimedia contents analysis, and speech coding may be supported.

23 Claims, 8 Drawing Sheets

U.S. PATENT DOCUMENTS

| | | | |
|---|---|---|---|
| 6,377,913 B1* | 4/2002 | Coffman et al. | 704/8 |
| 6,404,859 B1* | 6/2002 | Hasan | 379/88.04 |
| 6,430,177 B1* | 8/2002 | Luzeski et al. | 370/356 |
| 6,594,347 B1* | 7/2003 | Calder et al. | 379/88.01 |
| 6,594,628 B1 | 7/2003 | Jacobs et al. | 704/231 |
| 6,662,163 B1 | 12/2003 | Albayrak et al. | 704/275 |
| 6,738,743 B2* | 5/2004 | Sharma et al. | 704/270.1 |
| 6,748,375 B1* | 6/2004 | Wong et al. | 707/3 |
| 6,754,200 B1 | 6/2004 | Nishimura et al. | |
| 6,801,604 B2 | 10/2004 | Maes et al. | |
| 6,801,793 B1* | 10/2004 | Aarnio et al. | 455/566 |
| 2002/0006124 A1* | 1/2002 | Jimenez et al. | 370/352 |
| 2002/0022453 A1* | 2/2002 | Balog et al. | 455/41 |
| 2002/0046035 A1* | 4/2002 | Kitahara et al. | |
| 2002/0072918 A1* | 6/2002 | White et al. | 704/270.1 |
| 2002/0091527 A1* | 7/2002 | Shiau | |
| 2002/0120685 A1* | 8/2002 | Srivastava et al. | |
| 2002/0129010 A1* | 9/2002 | Fung et al. | |
| 2002/0147579 A1 | 10/2002 | Kushner et al. | |
| 2002/0184373 A1 | 12/2002 | Maes | |
| 2002/0194388 A1 | 12/2002 | Boloker et al. | |
| 2003/0161298 A1 | 8/2003 | Bergman et al. | |
| 2004/0056885 A1* | 3/2004 | Azami et al. | 345/723 |
| 2004/0199502 A1* | 10/2004 | Wong et al. | 707/3 |
| 2005/0059426 A1* | 3/2005 | Aarnio et al. | 455/550.1 |

FOREIGN PATENT DOCUMENTS

| | | |
|---|---|---|
| WO | WO-0058942 A2 | 10/2000 |
| WO | WO-01/35389 | 5/2001 |
| WO | WO-0195312 A1 | 12/2001 |

OTHER PUBLICATIONS

Boersma, Paul, "Accurate Short-Term Analysis of the Fundamental Frequency and the Harmonics-to-Noise Ratio of a Sampled Sound", *Institute of Phonetic Sciences, University of Amsterdam, Proceedings 17*, (1993), 97-110.

Wyard, P. J., et al., "Spoken Language Systems-Beyond Prompt and Response", *8438 BT Technology Journal, 14, No. 1*, BT Laboratories, (1996), 187-207.

"Speech Processing, Transmission and Quality aspects; Distributed speech recognition; Front-end feature extraction algorithm; Compression algorithms", *ETSI ES 201 108 V1.1.2 (Apr. 2000) ETSI Standard*, (2000), 20 pages.

"WebSphere Transcoding Publisher", http://www-3.ibm.com/software/webservers/transcoding/about.html,4 pages.

Allman, M., et al., "Increasing TCP's Initial Window", *RFC 2414, Internet Engineering Task force, Internet Draft*, (Sep. 1998), 13 pages.

Coyner, Mike, et al., "Distributed Speech Recognition Services (DSRS)", *International Symposium on Multimedia Software Engineering, Proceedings*, (Dec. 11-13, 2000), 59-66.

Hermes, Dik J., "Measurement of pitch by subharmonic summation", *J. Acoust. Soc. Am. 83 (1)*, (Jan. 1988),257-264.

Liu, Sharlene, et al., "The Effect of Fundamental Frequency on Mandarin Speech Recognition", *5th International Conference on Spoken Language Processing*, Sydney, Australia: ICSLP Proceedings, Th4R9, vol. 6, (Nov. 30-Dec. 4, 1998),2647-2650.

Mathis, M., et al., "TCP Selective Acknoledgement Options", *RFC 2018, Internet Engineering Task Force, Internet Draft.*, (Oct. 1996), 12 pages.

Pearce, David, "Enabling New Speech Driven Services for Mobile Devices: An overview of the ETSI standards activities for Distributed Speech Recognition Front-ends", *AVIOS 2000: The Speech Applications Conference*, San Jose, CA, Aurora Distributed Speech Recognition; http://www.etsi.org/T_news/Documents/AVIOS%20DSR%20 paper.pdf,(May 22-24, 2000), 12 pages.

Rabiner, Lawrence R., et al., "A Comparative Performance Study of Several Pitch Detection Algorithms", *IEEE Transactions on Acoustics, Speech, and Signal Processing*, vol. ASSP-24, No. 5, (Oct. 1976),399-418.

Zhang, Wei, et al., "The study on Distributed Speech Recognition System", ICASSP'00 Proceedings, (Jun. 5-9, 2000), 1431-1434.

* cited by examiner

INFORMATION RETRIEVAL CENTER GATEWAY

CROSS-REFERENCE TO RELATED APPLICATIONS

This application claims the benefit of U.S. Provisional Application No. 60/294,705, filed May 31, 2001.

FIELD

This invention relates generally to computers and more particularly to information retrieval using remote devices.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Intel, Incorporated, 2001. All Rights Reserved.

BACKGROUND

As the Internet has evolved, users have begun to access information on remote servers using small devices, such as handheld devices, cellular phones, laptop computers, and PDAs (Personal Digital Assistants). These small client devices have smaller displays, less powerful processors, less memory, and different user interfaces than traditional laptop or desktop computers.

Some of these devices suffer from problems when attempting to interface with current servers, which were designed to accommodate traditional desktop computers. First, some devices have awkward and difficult input techniques, such as selecting letters on a screen using a stylus or finger. Second, since current information providers have designed their data on the servers to have a format convenient for and compatible with traditional desktop computers, there can be a format mismatch between the data and the device attempting to receive the data and communicate it to the user. Third, the format of the data is often inconvenient for the users of small devices. Finally, small devices with a slow processor and small memory cannot easily handle the large amounts of data from current servers.

Thus, there is a need for a solution that will enable a variety of devices to take advantage of the data created by information providers.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
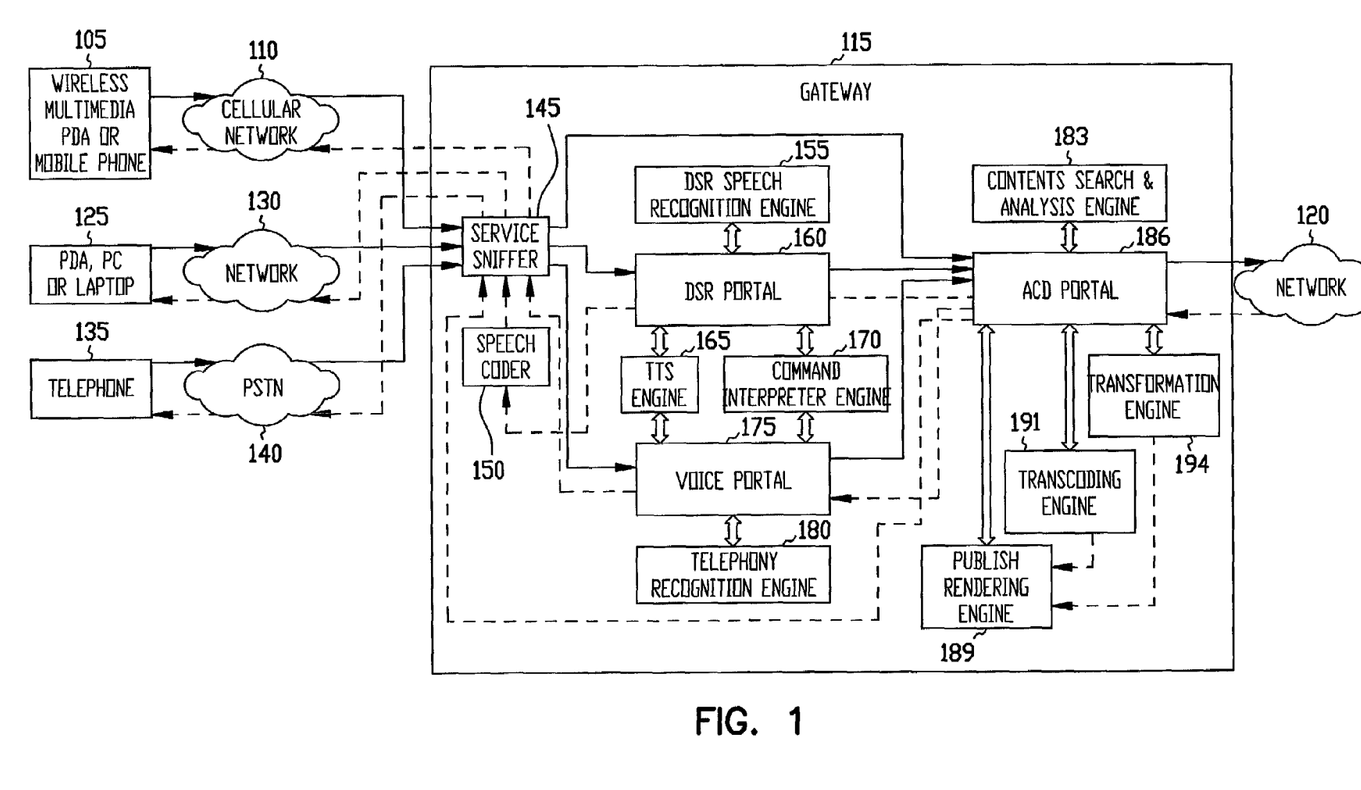
FIG. 1 depicts a block diagram of an embodiment of the invention.

FIG. 1 depicts a block diagram of an embodiment of the invention. Wireless Multimedia, a PDA, and a mobile phone 105 are shown communicatively coupled to cellular network 110, which is communicatively coupled to gateway 115. Gateway 115 is shown communicatively coupled to network 120, such as the Internet or an Intranet. PDA, PC (Personal Computer), or laptop 125 is shown communicatively coupled to Network 130, which is communicatively coupled to gateway 115. In an embodiment, network 130 may be the Internet, but in other embodiments any suitable network may be used. Telephone 135 is shown communicatively coupled to PSTN (Public Switched Telephone Network) 140, which is communicatively coupled to gateway 115. Gateway 115 includes service sniffer 145, speech coder 150, DSR (Distributed Speech Recognition) speech recognition engine 155, DSR portal 160, TTS (Text To Speech) engine 165, command interpreter engine 170, voice portal 175, telephony recognition engine 180, contents search and analysis engine 183, ACD (Adaptive Content Delivery) portal 186, publish rendering engine 189, transcoding engine 191, and transformation engine 194. In an embodiment, gateway 115 may be a functional unit that interconnects two networks with different network architectures. In an embodiment gateway 115 has the hardware configuration described below with respect to FIG. 3.

Figure 2:
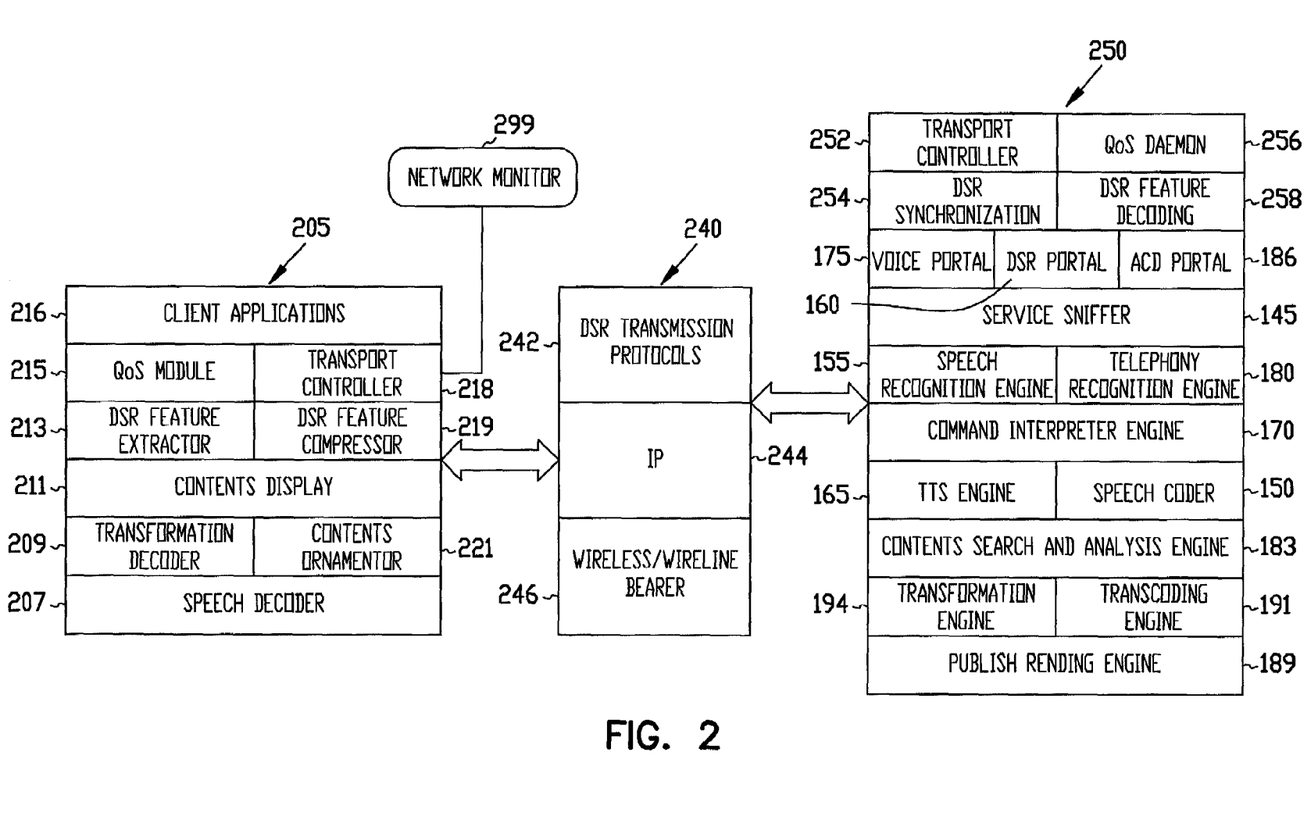
FIG. 2 depicts a block diagram of a stack of function blocks, according to an embodiment of the invention.

FIG. 2 depicts a block diagram of stacks of function blocks, according to an embodiment of the invention. Client 205, transmission medium 240, gateway 250, and network monitor 299 are shown.

Client device 205 represents functions in any of client devices 105, 125, and 135, as previously described above with reference to FIG. 1. Referring again to FIG. 2, client device 205 includes speech decoder 207, transformation decoder 209, contents display 211, DSR feature extractor 213, QoS (Quality of Service) module 215, client applications 216, transport controller 218, DSR feature compressor 219, and contents ornamentor 221. In other embodiments, client device 205 may include only selected functions.

Speech decoder 207 may decompress the compressed audio from gateway 115. Transformation decoder 209 may decode the transformed multimedia contents from gateway 115.

Contents Ornamentor 221 may ornament black-and-white multimedia contents to a higher-resolution multiple-scale gray format or higher-resolution pseudo color. Contents Ornamentor 221 also may minus adapt the multi-media contents for display on the screen size of client 205.

Contents display 211 adapts the received contents for proper display according to the physical properties of the client device. Examples of physical properties are screen size, screen resolution, and color depth. But, in other embodiments, any physical properties of the client device may be used. Contents display 211 processes the output of speech decoder 207, transformation decoder 209, and contents ornamentor 221 to finally display the contents at client 205. In an embodiment, the properties of the client device may be determined using the User Agent protocol, which provides a description of client device capabilities. In another embodiment, the CC/PP (Composite Capabilities/Preference Profiles) protocol may be used, which provides a description of client device capabilities and user preferences. In other embodiments, any suitable technique for determining the capabilities of the client device may be used. When client 205 initiates a session by negotiating with gateway 115, the type of client information (whether User Agent format, CC/PP format, or some other format) may be sent to inform gateway 115 about the client's capabilities.

DSR feature compressor 219 encodes the speech feature that may be sent to gateway 115. DSR feature extractor 213 extracts the speech feature from the user's speech. In an embodiment DSR feature extractor 213 uses MFCC (Mel-Frequency Cepstral Coefficients) to extract the speech feature. In an embodiment, the HMM (Hidden Markov Model) may be used for speech recognition. QoS Module 215 may be an interface to network monitor 299. QoS Module 215 accepts QoS information from network monitor 299 and gives feedback information to gateway 115. Transport Controller 218 receives QoS information from QoS Module 215 and then transfers it to gateway 115, or vice versa. Transport controller 218 also starts transmission for heterogenous network bearers.

Network Monitor 299 on the client side monitors the information stream from gateway 115 to client 205, measures QoS parameters for this information stream, and reports this QoS information to client applications 216.

Components stack in transmission medium 240 includes DSR transmission protocols 242, IP (Internet Protocol) 244, and Wireless/Wireline Bearer 246. DSR transmission protocol 242 may be an application layer protocol that may be above IP 244. With QoS module 215 and transport controller 218, DSR transmission protocol 242 transmits compressed speech and retrieves information efficiently and robustly. IP 244 may be a protocol that governs the breakup of data messages into packets, the routing of the packets from sender to destination, and the reassembly of the packets into the original data messages at the destination. Wireless/Wireline bearer 246 may be a transport protocol that transmits audio packets across a transmission medium. Examples of appropriate wireless/wireline bearers include GPRS (General Packet Radio Service), EDGE (Enhanced Data Rate for GSM and TDMA/136 Evolution), 3G (Third Generation Mobile Communication System), and the Internet. In other embodiments, any appropriate wireless/wireline protocol may be used.

Gateway stack 250 represents a stack of functions in gateway 115. Gateway stack 250 includes service sniffer 145, speech coder 150, DSR speech recognition engine 155, DSR portal 160, TTS engine 165, command interpreter engine 170, voice portal 175, telephony recognition engine 180, contents search and analysis engine 183, ACD portal 186, publish rendering engine 189, transcoding engine 191, and transformation engine 194.

When client 205 initiates a session by negotiating with gateway 115, the type of client information (whether User Agent format, CC/PP format, or some other format) may be sent to inform gateway 115 about the client's capabilities. This client information may be used by ACD portal 186 to adapt the contents presentation via publish rendering engine 189, transformation engine 194, and transcoding Engine 191.

Publish rendering engine 189 renders a particular format, in an embodiment HTML (Hypertext Markup Language) or WML (Wireless Markup Language), for client 205. In other embodiments, any appropriate format may be rendered. Examples of the functions of publish rendering engine 189 include converting one display page into multiple pages or converting one display line into multiple lines, including fractions of lines. But, any rendering function may be used, and the invention is not so limited.

Transformation engine 194 converts a data format used in the contents retrieved from network 120 into a format supported by client device 205. For example, some clients may not be able to display GIF (Graphics Interchange Format) images because of software or hardware constraints, so transformation engine 194 converts the GIF images into a format that the client does support, such as BMP (raster graphics stored in bitmap format), JPEG (Joint Photographic Experts Group), or black-and-white images. But, the invention is not limited to these particular formats.

Transcoding Engine 191 converts the original content retrieved from network 120 within multiple fidelities and modalities and selects the proper content version for particular clients 205. Typical examples of fidelity transcoding include summarizing, including image compression, text summarization, and video key-frame extraction. In other embodiments, any appropriate fidelity transcoding may be used. Modality transcoding may be translation, such as conversion from text to audio, or video to images. In other embodiments, any appropriate translation may be used.

Contents search and analysis engine 183 receives keywords from DSR Portal 160, voice portal 175, or directly from service sniffer 145. According to the given keywords, contents search and analysis engine 183 searches network 120 for appropriate contents, analyzes the contents, extracts the contents most relevant to the keywords, and then returns the results to DSR portal 160, voice portal 175, or directly to service sniffer 145.

TTS engine 165 translates text in the retrieved contents into audio speech. Speech coder 150 compresses audio to accommodate the bandwidth of transmission medium 240. Command interpreter engine 170 detects and interprets the purpose for user's inputs especially for the methodology of voice inputs. Telephony recognition engine 180 performs speech recognition for voice input from client 135. Speech recognition engine performs speech recognition for DSR portal 160.

Service sniffer 145 distinguishes between different inputs from clients and directs them to the appropriate services within gateway 115. The different inputs from clients may be classified into three basic types: traditional telephone services (which are directed to voice portal 175), forthcoming DSR services (which are directed to DSR portal 160), and routine IP based services (which are directed to ACD portal 186). Service sniffer 145 acts as an interface between transmission medium 240 and gateway 115.

Voice portal 175 controls the input and output of telephony recognition engine 180. Voice portal 175 sends speech data to telephony recognition engine 180 and retrieves the recognition result back. Either TTS engine 165 or command interpreter engine 170 processes the recognition result and either returns the recognition result to client 205 or uses the recognition result to request more services, for example by using the recognition result to search network 120.

DSR portal 160 performs analogous functions as voice portal 175, but operates in a DSR environment and processes speech feature data.

ACD portal 186 receives information retrieving commands and searches for the information in the Internet using contents search and analysis engine 183. The results of the search are processed by transformation engine 194 or transcoding engine 191, after which the results are returned to client 205 in the particular format supplied by publish rendering engine 189.

DSR synchronization 254 lies in the DSR receiver side and synchronizes received DSR bit-streams. DSR feature decoding 258 decodes the compressed feature data from clients 205.

QoS Daemon 256 receives QoS requesting information from client 205, adjusts the QoS parameters of the client according to practical network conditions, and then sends these modified QoS parameters back to client 205.

Transport Controller 252 supervises QoS information of the network and other network states and then reports the state information to QoS Daemon 256.

Figure 3:
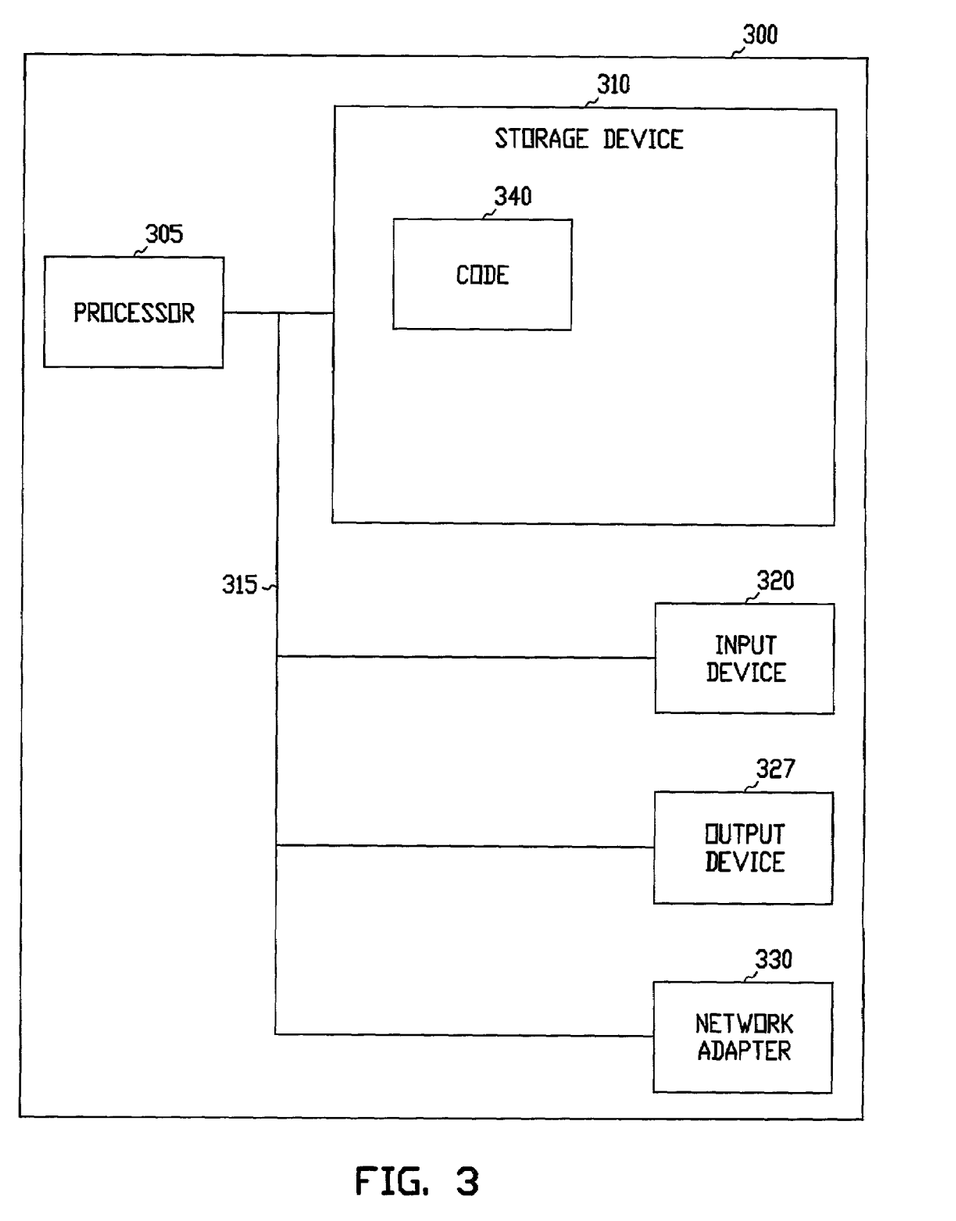
FIG. 3 depicts a block diagram of an exemplary electronic device according to an embodiment of the invention.

FIG. 3 shows a block diagram illustrating an exemplary electronic device 300 according to an embodiment of the invention. The exemplary electronic device 300 includes processor 305, storage device 310, input device 320, output device 327, and network adapter 330, all communicatively coupled via bus 315. An unillustrated network may also be coupled to bus 315 through network adapter 330.

Processor 305 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 305 executes instructions and includes that portion of electronic device 300 that controls the operation of the entire electronic device. Although not depicted in FIG. 1, processor 305 typically includes a control unit that organizes data and program storage in computer memory and transfers data and other information between the various parts of the electronic device. Processor 305 receives input data from input device 320 and network adapter 330, reads and stores code and data in storage device 310, and optionally presents output data to a user via output device 327. Processor 305 also sends and receives packets of information across a network using network adapter 330.

Although electronic device 300 is shown to contain only a single processor and a single system bus, the present invention applies equally to computers that have multiple processors and to computers that have multiple buses that each performs different functions in different ways.

Storage device 310 represents one or more mechanisms for storing data. For example, storage device 310 may include read only memory (ROM), random access memory (RAM), magnetic disk storage mediums, optical storage mediums, flash memory devices, and/or other machine-readable mediums. Although only one storage device 310 is shown, multiple storage devices and multiple types of storage devices may be present. Further, although electronic device 300 is drawn to contain storage device 310, the storage device may be distributed across other electronic devices. Storage device 310 contains code 340, which has instructions capable of being executed on processor 305 to carry out the functions of the present invention. In another embodiment, the functions of the present invention may be carried out via hardware in lieu of a processor-based system. Of course, storage device 310 may also contain additional software and data (not shown), which is not necessary to understanding the invention.

Bus 315 represents one or more busses (e.g., PCI (Peripheral Component Interconnect), ISA (Industry Standard Architecture), X-Bus, EISA (Extended Industry Standard Architecture), or any other appropriate bus) and bridges (also termed bus controllers).

Input device 320 is that part of electronic device 300 that accepts input from a user. In an embodiment, input device 320 may be a keyboard, but in other embodiments, input device 320 may be a pointing device, mouse, trackball, keypad, touchpad, touch screen, pointing stick, microphone, or any other appropriate input device.

Output device 327 communicates information to the user of electronic device 300. Output device 327 may be a cathode-ray tube (CRT) based video display well known in the art of computer hardware. But, in other embodiments output device 327 may be replaced with a liquid crystal display (LCD) based or gas, plasma-based, flat-panel display. In other embodiments, any appropriate display device is used. In still other embodiments, a speaker that produces audio output may be used. In other embodiments, output device 327 might not be present.

Network adapter 330 facilitates communication between electronic device 300 and an unillustrated network. Network adapter 330 provides a user of electronic device 300 with a means of electronically communicating information, such as packets, with a remote computer or a network logical-storage device. In addition, in another embodiment, network adapter 330 supports distributed processing, which enables electronic device 300 to share a task with other devices linked to the network. Although network adapter 330 is shown as part of electronic device 300, in another embodiment they may be packaged separately.

Electronic device 300 may be implemented using any suitable hardware and/or software, such as a personal computer available from a number of vendors. Portable computers, laptop computers, mainframe computers, handheld devices, PDAs, telephones, cellular telephones, and network computers or Internet appliances are examples of other possible configurations. Electronic device 300 is an example implementation of devices 105, 125, 135, and/or 115. The hardware and software depicted in FIG. 3 may vary for specific applications and may include more or fewer elements than those depicted. For example, other peripheral devices such as pointing devices, speech recognition devices, audio adapters, or chip programming devices, such as EPROM (Erasable Programmable Read-Only Memory) programming devices may be used in addition to or in place of the hardware already depicted. Thus, an embodiment of the invention may apply to any hardware configuration.

As will be described in detail below, aspects of an embodiment pertain to specific apparatus and method elements implementable on computers. In another embodiment, the invention may be implemented as a computer program product for use with a computer system. The programs defining the functions of this embodiment may be delivered to a computer via a variety of signal-bearing media, which include, but are not limited to:

(1) information permanently stored on non-rewriteable storage media (e.g., read only memory devices within a computer such as CD-ROM readable by a CD-ROM drive;

(2) alterable information stored on rewriteable storage media (e.g., a hard disk drive or diskette); or (3) information conveyed to a computer by a communications media, such as through a computer or telephone network accessed via network adapter 330, including wireless communications.

Such signal-bearing media, when carrying processor-readable instructions that direct the functions of the present invention, represent embodiments of the present invention.

Figure 4:
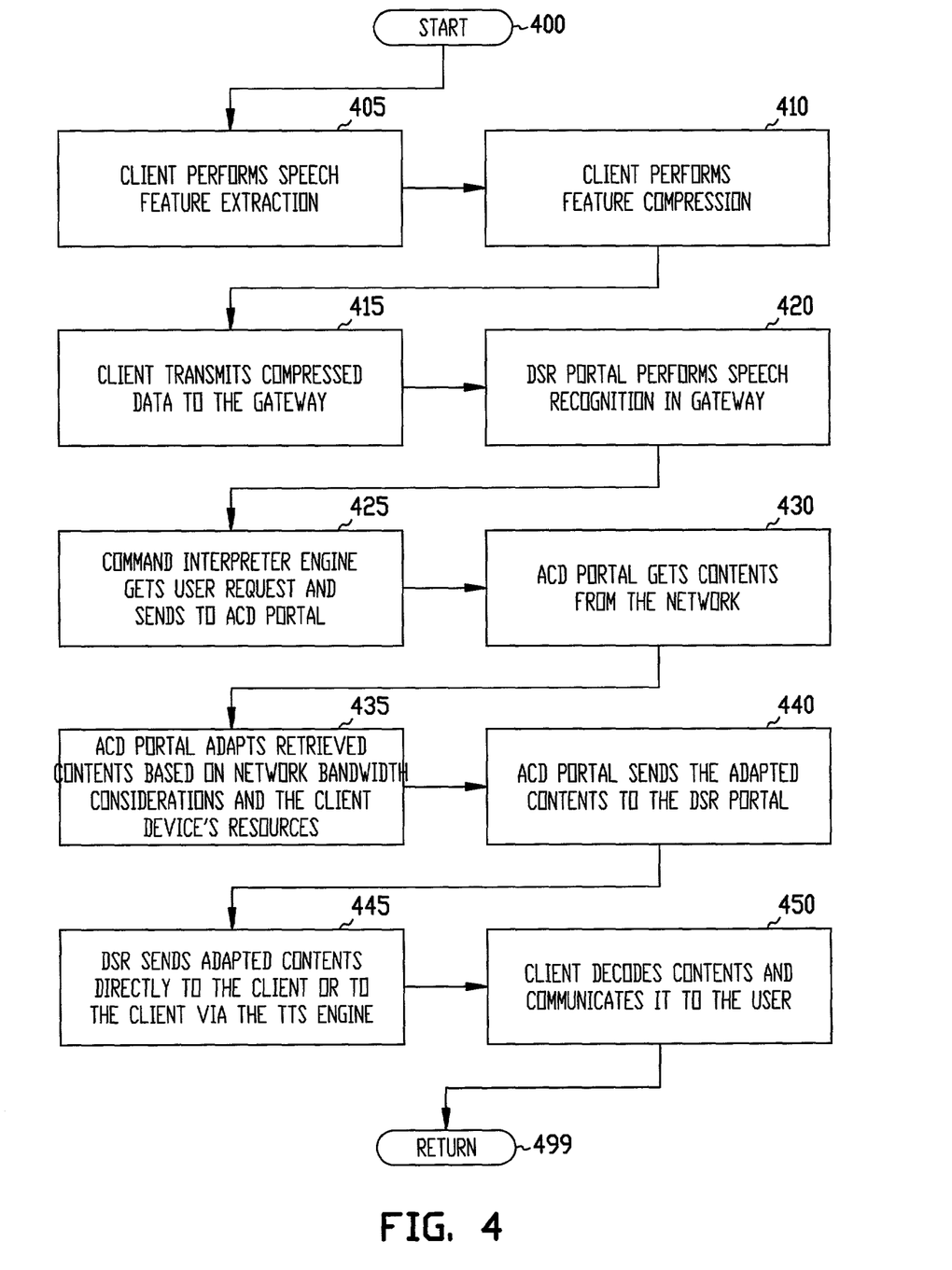
FIG. 4 depicts a flowchart of processing when the client device is a wireless or wire handset and speech is used for information retrieval.

FIG. 4 depicts a flowchart of processing when the client device is a wireless or wire handset and speech is used for information retrieval. Control begins at block 400. Control then continues to block 405 where client 105 performs speech feature extraction. Control then continues to block 410 where client 105 performs feature compression. Control then continues to block 415 where client 105 transmits the compressed data to gateway 115. Control then continues to block 420 where DSR portal 160 performs speech recognition on the compressed data. Control then continues to block 425 where command interpreter engine 170 determines the user request from the output of DSR portal 160 and sends the user request to ACD portal 186. Control then continues to block 430 where ACD portal 186 retrieves the contents associated with the user request from network 120. Control then continues to block 435 where ACD portal 186 adapts retrieved contents based on network bandwidth considerations and the client devices's resources. Control then continues to block 440 where ACD portal 186 sends the adapted contents to DSR portal 160.

Control then continues to block 445 where DSR portal 160 sends some of the adapted contents directly to client 105. DSR portal 160 sends those contents directly to client 105 that link to the URL (Uniform Resource Locator) of a video, image, or audio database. A URL may be an address in a network. DSR portal 160 also sends some of the adapted contents to TTS 165, which converts the contents to speech and then sends the speech to speech coder 150, which compresses the speech and sends it to client 105. DSR portal 160 chooses adapted contents to send to TTS 165 based on information in text adapted contents that indicates the contents are text intended to be published to users in audio speech format. In an embodiment, this indication may be supplied by a prompt tag, although in other embodiments any appropriate indication may be used.

Control then continues to block 450 where client 105 decodes the contents and communicates it to the user. Control then continues to block 499 where the function returns.

Figure 5:
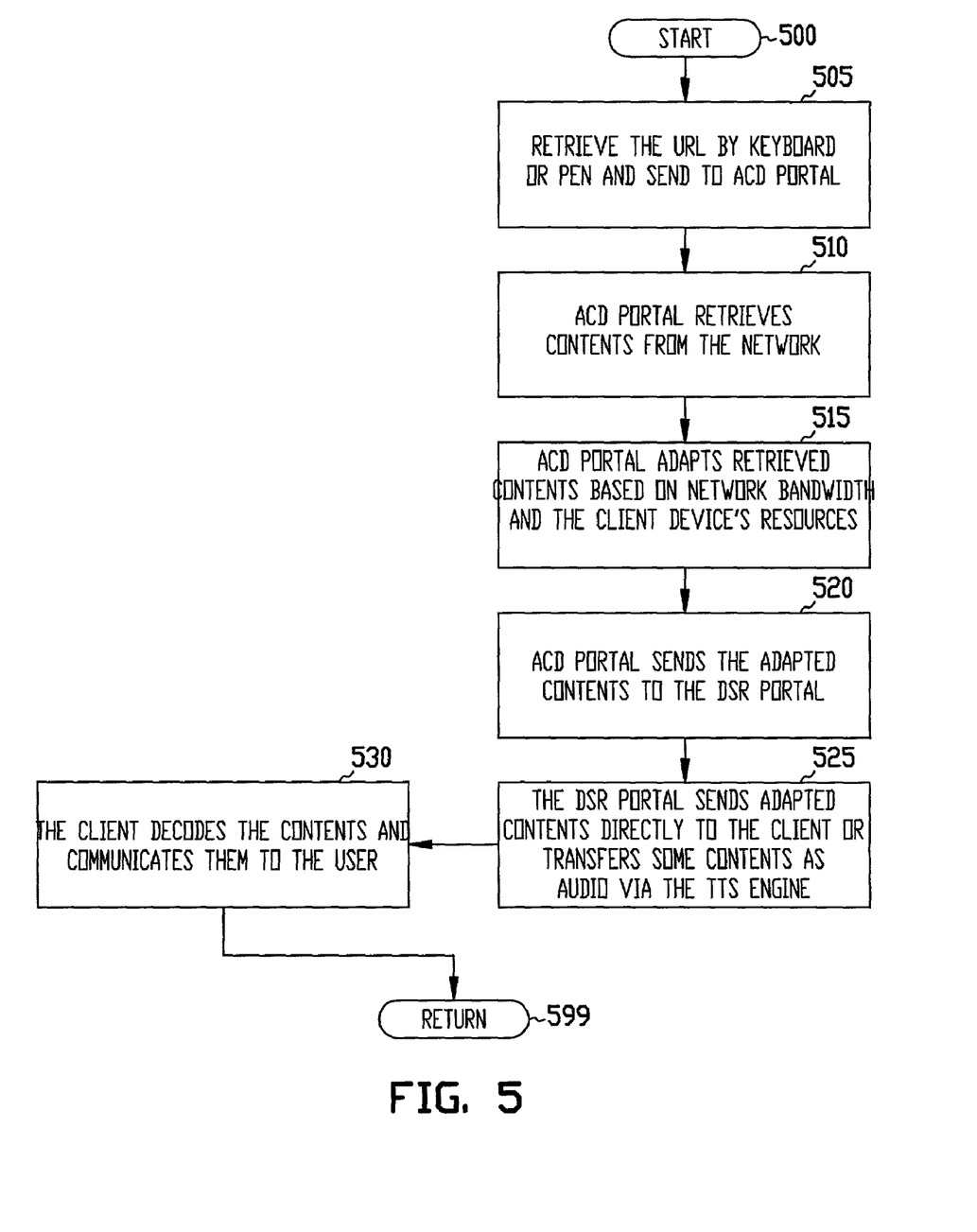
FIG. 5 depicts a flowchart of processing when the client device is a wireless or wire handset and a keyboard or pen is used for information retrieval.

FIG. 5 depicts a flowchart of processing when the client device is a wireless or wire handset and a keyboard or pen is used for information retrieval. Control begins at block 500. Control then continues to block 505 where client 105 gets a URL from the keyboard or pen input. Client 105 sends the URL to ACD portal 186 in gateway 115. Control then continues to block 510 where ACD portal 186 retrieves the contents associated with the URL from network 120. Control then continues to block 515 where ACD portal 186 adapts the retrieved contents based on network bandwidth and the resources of client device 105. Control then continues to block 520 where ACD portal 186 sends back the adapted contents to DSR portal 160.

Control then continues to block 525 where DSR portal 160 sends some of the adapted contents directly to client 105. DSR portal 160 also sends some of the adapted contents to TTS 165, which converts the contents to speech and then sends the speech to speech coder 150, which compresses the speech and sends it to client 105. Control then continues to block 530 where client 105 decodes the encoded contents and communicates them to the user. Control then continues to block 599 where the function returns.

Figure 6:
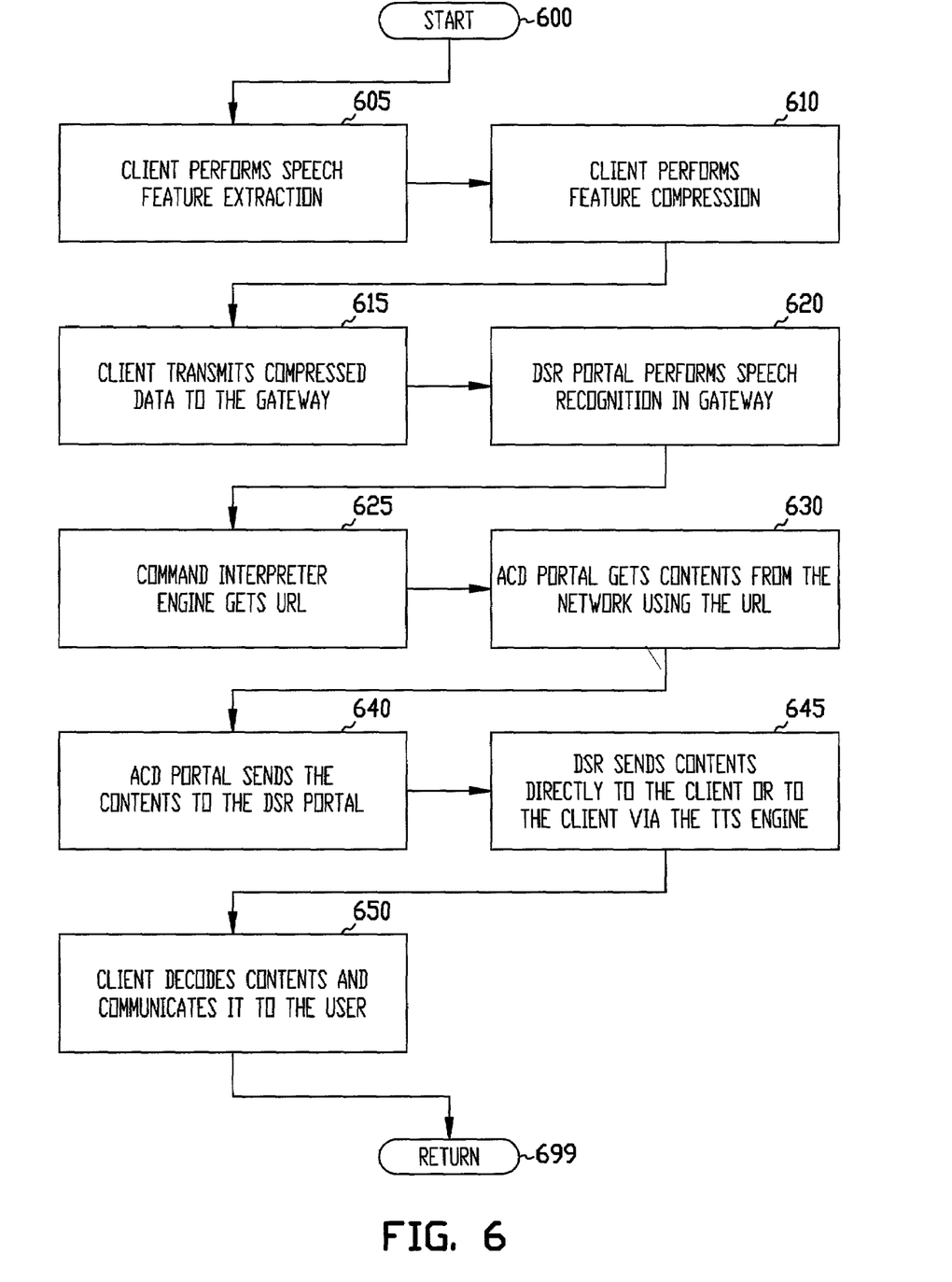
FIG. 6 depicts a flowchart of processing when the client device is a desktop or laptop computer and speech is used for information retrieval.

FIG. 6 depicts a flowchart of processing when the client device is a desktop or laptop computer and speech is used for information retrieval. Control begins at block 600. Control then continues to block 605 where client 125 performs speech-feature extraction. Control then continues to block 610 where client 125 performs feature compression. Control then continues to block 615 where client 125 transmits the compressed data to gateway 115. Control then continues to block 620 where DSR portal 160 performs speech recognition on the compressed data. Control then continues to block 625 where command interpreter engine 170 determines the URL associated with the output of DSR portal 160 and sends the URL to ACD portal 186. Control then continues to block 630 where ACD portal 186 retrieves the contents associated with the URL. Control then continues to block 640 where ACD portal 186 sends the contents to DSR portal 160. Control then continues to block 645 where DSR portal 160 sends some of the contents directly to client 125. DSR portal 160 also sends some of the contents to TTS 165, which converts the contents to speech and then sends the speech to speech coder 150, which compresses the speech and sends it to client 125. Control then continues to block 650 where client 125 decodes the contents and communicates it to the user. Control then continues to block 699 where the function returns.

Figure 7:
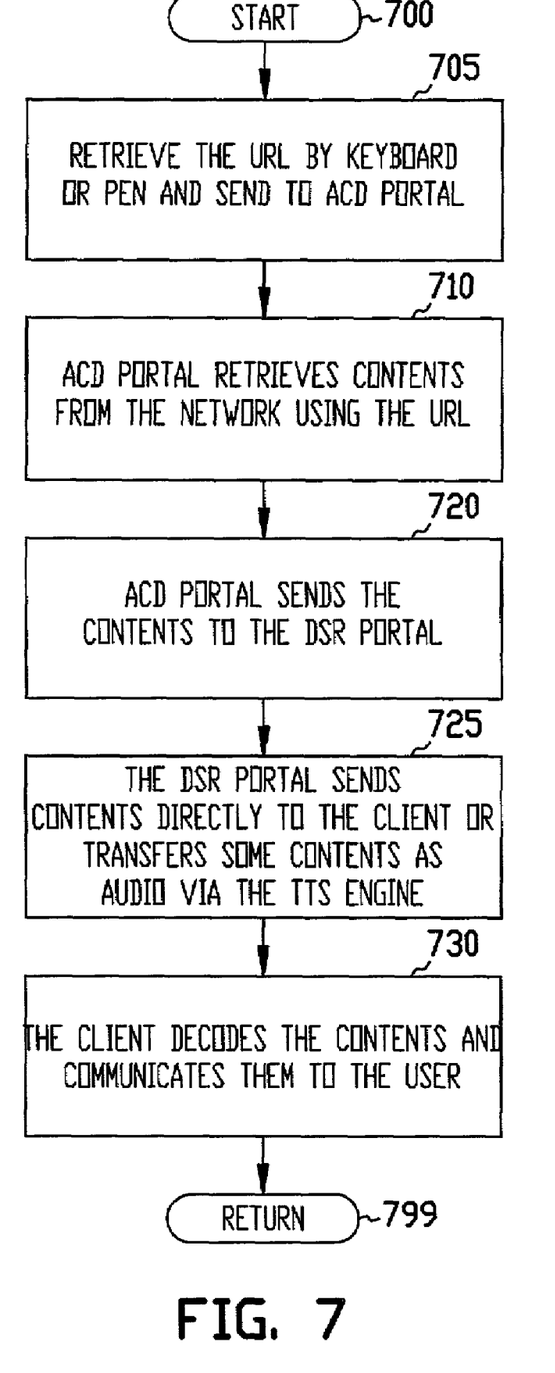
FIG. 7 depicts a flowchart of processing when the client device is a desktop or laptop computer and a keyboard or pen is used for information retrieval.

FIG. 7 depicts a flowchart of processing when the client device is a desktop or laptop computer and a keyboard or pen is used for information retrieval. Control begins at block 700. Control then continues to block 705 where client 125 obtains a URL from the keyboard or pen input. Client 125 sends the URL to ACD portal 186 in gateway 115. Control then continues to block 710 where ACD portal 186 retrieves the contents associated with the URL from network 120. Control then continues to block 720 where ACD portal 186 sends back the contents to DSR portal 160. Control then continues to block 725 where DSR portal 160 sends some of the contents directly to client 125. DSR portal 160 also sends some of the contents to TTS 165, which converts the contents to speech and then sends the speech to speech coder 150, which compresses the speech and sends it to client 125. Control then continues to block 730 where client 125 decodes the encoded contents and communicates them to the user. Control then continues to block 799 where the function returns.

Figure 8:
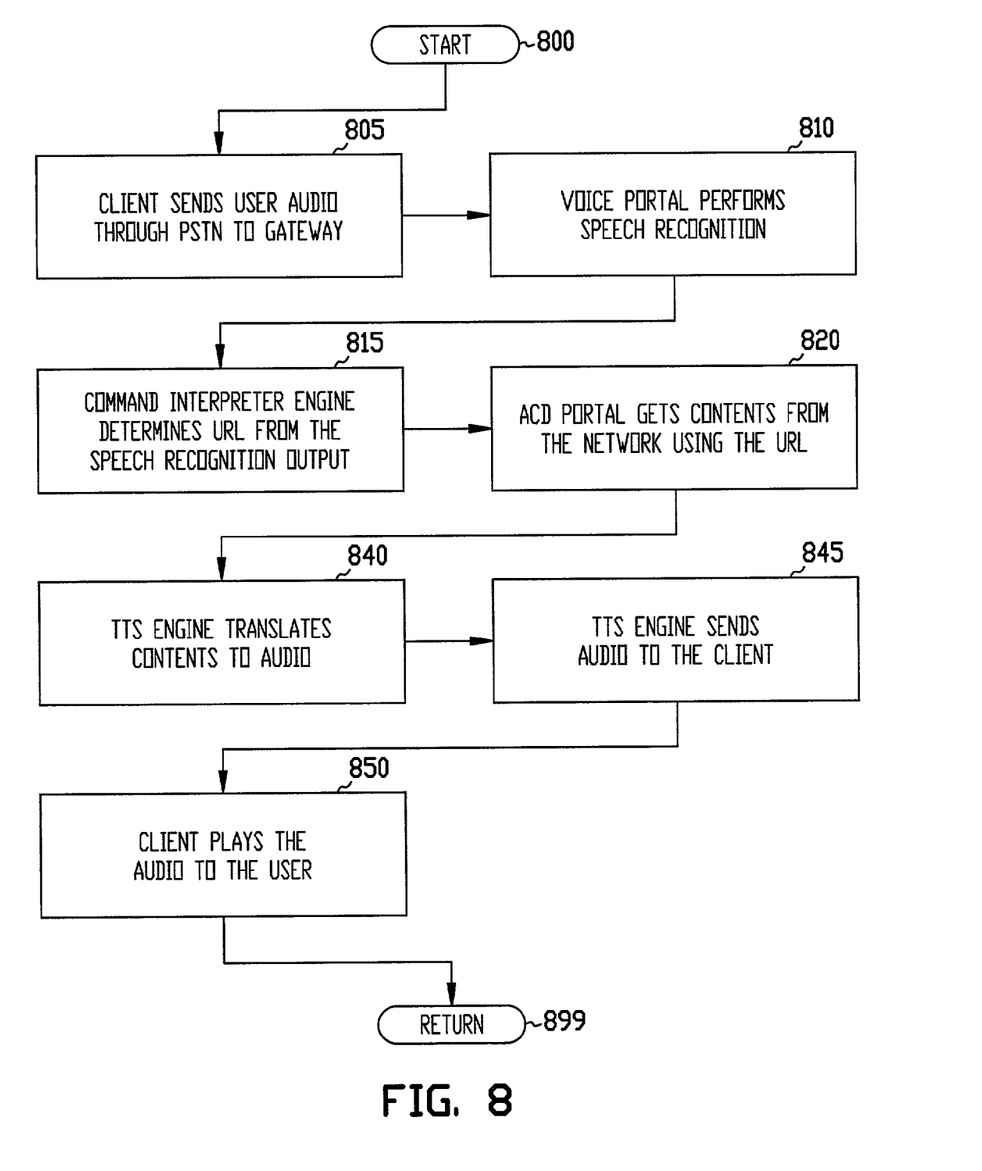
FIG. 8 depicts a flowchart of processing when the client device is a telephone and speech is used for information retrieval.

FIG. 8 depicts a flowchart of processing when the client device is a telephone and speech is used for information retrieval. Control begins at block 800. Control then continues to block 805 where client 135 sends user audio to gateway 115 via PSTN 140. Control then continues to block 810 where voice portal 175 performs speech recognition. Control then continues to block 815 where command interpreter engine 170 determines the URL based on the output of voice portal 175. Control then continues to block 820 where ACD portal 186 retrieves contents from network 120 based on the URL. Control then continues to block 840 where TTS engine 165 translates the retrieved contents to audio. Control then continues to block 845 where TTS engine 165 transfers the audio to client 135. Control then continues to block 850 where client 135 plays the audio to the user. Control then continues to block 899 where the function returns.

What is claimed is:

1. A gateway, comprising:
  a service sniffer operable to receive from a client device a format informing the gateway about a client device's capabilities including any display capabilities of the client device, the service sniffer further operable to direct inputs from the client device to a plurality of portals based on the type of data received from the client device;
  a command interpreter engine coupled to one or more of the plurality of portals to detect keywords in speech when the data received includes a compressed speech input;
  a search and analysis engine to search a network for contents based on the keywords;
  a transcoding engine coupled to the one or more of the plurality of portals and operable to convert contents retrieved from the network within multiple fidelities and modalities and to select a proper content version for the client device based on the format informing the gateway about the client device's capabilities; and
  a transformation engine to convert a data format used in the contents retrieved from the network into the format supported by the client device based on the format informing the gateway about the client device's capabilities.

2. The gateway of claim 1, wherein the transformation engine is to convert an image from one format into another format.

3. The gateway of claim 1, wherein the service sniffer is adapted to distinguish between traditional telephone services, DSR (distributed speech recognition) services, and IP (internet protocol) services received from the client device.

4. The gateway of claim 3, wherein the service sniffer is to direct telephone services to a voice portal.

5. The gateway of claim 3, wherein the service sniffer is to direct DSR (distributed speech recognition) services to a DSR portal.

6. The gateway of claim 3, further comprising:
  a quality of service daemon to receive quality of service requesting information from the client device.

7. The gateway of claim 6, wherein the quality of service daemon is further to adjust quality of service parameters of the client device according to network conditions and then to send the adjusted quality of service parameters to the client device.

8. The gateway of claim 1, further comprising:
  a text-to-speech engine to translate text in the contents into audio speech.

9. The gateway of claim 1, further comprising:
  a speech coder to compress audio to accommodate bandwidth of a transmission medium between the client device and the gateway.

10. The gateway of claim 1, further comprising:
  a publish rendering engine to convert a display page into multiple pages.

11. The gateway of claim 1, further comprising:
  a publish rendering engine to convert a display line into multiple lines.

12. A method, comprising:
  receiving from a client device a format including a description of a client device's capabilities and a user input including data from the client device;
  directing the user input to one or more of a plurality of portals based on the type of data received in the user input;
  extracting a feature from the data included in the user input;
  translating the feature into a request including a uniform resource locator;
  retrieving contents from a network based on the request including a uniform resource locator; and
  adapting the contents to the client device based on the received description of the client device's capabilities, including adapting the contents to a screen size, a screen resolution, and a color depth of device based on the format from the client device including the description of the client device's capabilities.

13. The method of claim 12, wherein the adapting further comprises converting text to audio speech.

14. The method of claim 12, wherein the adapting further comprises converting a display page into multiple pages.

15. The method of claim 12, wherein the adapting further comprises converting a display line into multiple lines.

16. The method of claim 12, wherein the user input comprises an address of the contents.

17. The method of claim 16, wherein the address is a uniform resource locator.

18. The method of claim 12, wherein the feature further comprises at least one keyword in the user input.

19. A program product comprising instructions stored on a computer memory, wherein the instructions when read and executed comprise:
  receiving from a client device a format including a description of a client device's capabilities and a user input including data from the client device;
  directing the user input to one or more of a plurality of portals based on the type of data received in the user input;
  extracting a feature from the data included in the user input;
  translating the feature into a request including a uniform resource locator;
  retrieving contents from a network based on the request including a uniform resource locator; and
  adapting the contents for transmission to the client device based on the received description of the client device's capabilities, including adapting the contents to a screen size, a screen resolution, and a color depth of the client device based on the format from the client device including the description of the client device's capabilities.

20. The program product of claim 19, wherein the feature comprises a keyword to be searched.

21. The program product of claim 19, wherein the adapting further comprises:
  translating text in the contents into audio speech.

22. The gateway of claim 1, wherein the format informing the gateway about the client device's capabilities includes a User Agent protocol.

23. The gateway of claim 1, wherein the format informing the gateway about the client device's capabilities includes a Composite Capabilities/Preference Profiles protocol.

* * * * *

UNITED STATES PATENT AND TRADEMARK OFFICE
CERTIFICATE OF CORRECTION

PATENT NO. : 7,366,712 B2 Page 1 of 1
APPLICATION NO. : 09/938322
DATED : April 29, 2008
INVENTOR(S) : He et al.

It is certified that error appears in the above-identified patent and that said Letters Patent is hereby corrected as shown below:

In column 10, line 17, in Claim 12, after "of" insert -- the client --.

Signed and Sealed this

Fifth Day of August, 2008

JON W. DUDAS
*Director of the United States Patent and Trademark Office*